Sept. 29, 1936. C. SCHLUMBERGER Re. 20,120

CORE TAKING DEVICE

Original Filed Feb. 7, 1934 2 Sheets-Sheet 1

Inventor
Conrad Schlumberger,
by Marrot Lewis,
Attorneys.

Sept. 29, 1936. C. SCHLUMBERGER Re. 20,120

CORE TAKING DEVICE

Original Filed Feb. 7, 1934 2 Sheets-Sheet 2

Inventor:
Conrad Schlumberger,
By Mauro + Lewis
Attorneys

Reissued Sept. 29, 1936 Re. 20,120

UNITED STATES PATENT OFFICE 20,120

CORE TAKING DEVICE

Conrad Schlumberger, deceased, late of Paris, France, by Anne Marguerite Louise Doll, born Schlumberger, administratrix, Paris, France; said Conrad Schlumberger assignor, by mesne assignments, to Schlumberger Well Surveying Corporation, Houston, Tex., a corporation of Delaware Original No. 2,020,856, dated November 12, 1935, Serial No. 710,193, February 7, 1934. Application for reissue July 11, 1936, Serial No. 90,262. In France March 10, 1933

16 Claims. (Cl. 255—1)

Cores, that is to say samples of rock withdrawn from bore holes for examination and identification of the formations traversed, are generally cut off from the rock at the bottom of the hole.

The object of the present invention is to provide an arrangement by means of which one can obtain at any depth and at any time before lowering of the casing samples of the rock forming the wall of a bore hole. By this arrangement it is possible to sample formations which have already been more or less accurately identified, either by examination of the mud cuttings brought up by the boring or by electrical coring processes described in Patents Nos. 1,819,923 of Aug. 18, 1931, and 1,913,293 of June 6, 1933. The taking of cores can thus be confined to geological strata which are already considered to be of interest. With the usual procedure, however, it is frequently impossible to forecast whether the core about to be cut off at the bottom of a hole will be of any practical value, and this fact leads either to the very expensive solution of the continuous coring or to the risk of missing the cores from the interesting beds.

There are already a certain number of mechanical devices by means of which lateral cores can be taken at a previously fixed depth, such as, for example, those described in the Patents Nos. 1,635,340, 1,683,642, 1,815,661 and 1,955,166. The present invention differs therefrom on the one hand by the fact that the movements which the coring apparatus has to carry out after being lowered into the hole are controlled from the surface by means of an electric cable with one or more insulated conductors connecting the device lowered into the hole to a source of current installed at the surface; and on the other hand, it differs also by the fact that the coring apparatus may be provided with a special suction device for taking samples of fluid (especially oil) contained in porous beds.

This electric cable may advantageously be used for the raising and lowering of the coring apparatus. For this purpose the cable is wound on a winch at the surface and has sufficient mechanical strength to support the weight of the coring arrangement suspended at its lower end.

Great precision is often required to determine the depth to which the apparatus must be lowered. This occurs for example when the core has to be taken from a thin bed at a great depth. In such a case it is very advantageous to combine with the coring apparatus an electric prospecting device in accordance with the two patents first mentioned above (Nos. 1,819,923 and 1,913,293). In this way it is easy to lower the coring apparatus exactly to the depth of a given bed which is recognized from the surface by the electrical prospecting device.

The accompanying drawings show in a non-limiting manner a constructional form of coring apparatus in accordance with the invention. Herein—

Figure 1:
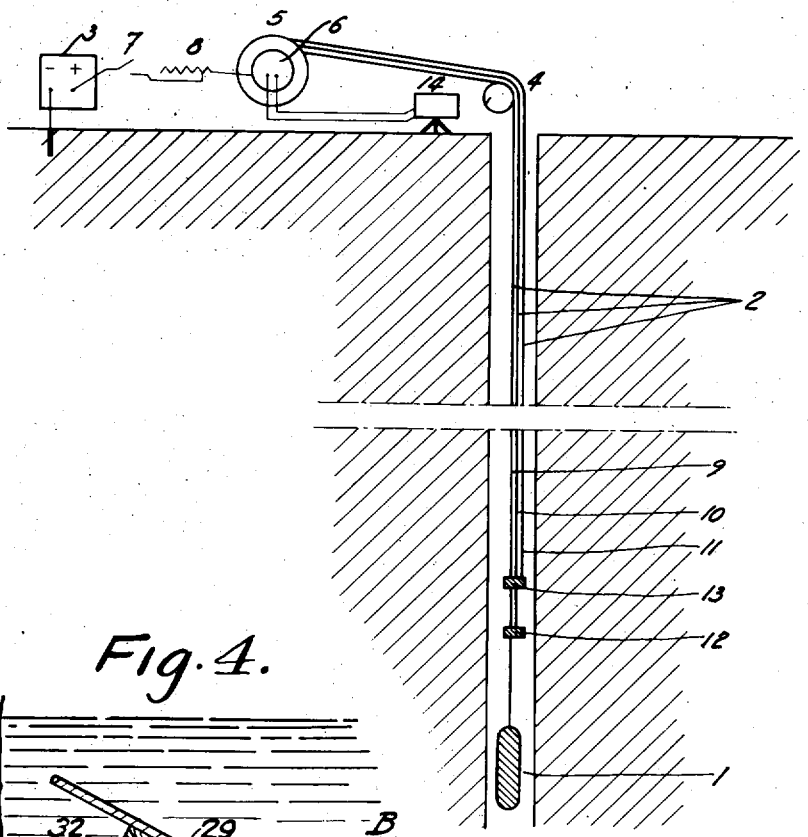
Figure 1 is a general view in vertical section illustrating diagrammatically means that may be used to control the coring arrangement.

In Fig. 1 the coring body 1, which is lowered into the bore hole, is attached to an electric cable 2. This cable may have only one insulated conductor for transmitting the electric power generated by a battery 3, but it is useful to have at least two supplementary insulated conductors in order to control the depths by means of an electrical diagram, as explained below.

This cable passes over a pulley 4, and is wound upon a winch 5.

The current is conveyed from battery 3 to the coring apparatus 1 by the insulated conductor 9 of the cable, through a collector 6 disposed on the winch, a switch 7, a controlled resistance 8, and through the ground.

In order to control the depths by means of an electric diagram, two of the insulated conductors 10 and 11 of the cable 2 are connected to two electrodes 12 and 13.

By means of the collector 6 of the winch, these two electrodes are connected to a measuring instrument 14.

When sending an electric current to the coring body 1, the metallic body acts as a current electrode. Consequently this arrangement makes it possible to record the electrical resistivity log of the bore hole as explained in Patent 1,819,923. As mentioned below the intensity of the current is so small as not to start the operation of the coring member. Using only one of the electrodes 12 or 13, it is also possible to apply the method of Patent 1,913,293.

It is thus possible to control the exact position of the coring body in respect to a given bed by comparing the electrical measurements with a diagram previously taken in the same drill-hole and showing the depth of said bed.

Figure 2:
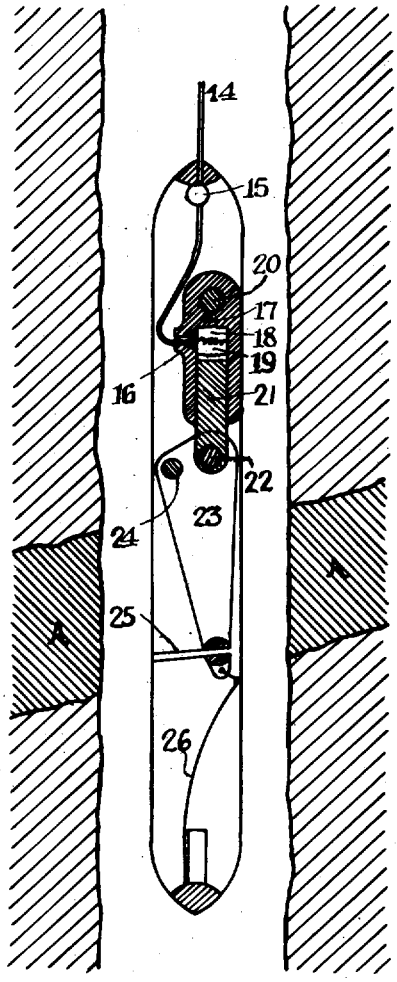
Figure 2 is a diagrammatic sectional elevation of the coring arrangement lowered in a bore hole.
Figure 3:
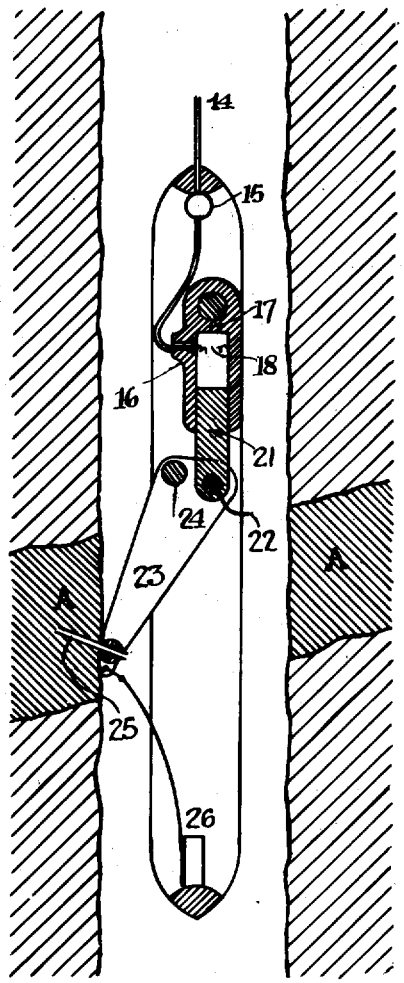
Figure 3 is a similar view of the same in the act of taking a core.

In the form of coring apparatus shown in Figures 2 and 3 electric control is used to set the coring tool into motion but the mechanical power necessary for this motion is obtained from the explosion of powder. In these figures, 9 is one of the insulated conductors of the electric cable, which is attached at 15 to the top of the frame of the apparatus and serves to lower the latter to the desired depth. This conductor 9 passes by an insulating joint 16 through the wall of a cylinder 17 and terminates in a fuse 18, connected by its other terminal to the metallic body of the apparatus. Around the fuse 18 and consequently within the cylinder 17 there is a charge of explosive 19. The cylinder 17 is attached to the frame of the apparatus by a hinge pin 20 and is provided with a piston 21, itself pivoted at 22 to a lever 23 capable of swinging in relation to the frame about the pivot pin 24. This lever has at its lower end a sampling tube (hollow punch) 25.

An electrical battery at the surface, with one pole grounded, is used to send the ignition current through the fuse 18, the circuit being closed through the metallic frame and the mud which usually fills the bore hole. If the bore hole does not contain conducting mud, a two-conductor cable is used, connected at the lower end to the two terminals of the fuse, and at the surface to the two poles of the battery.

The fuse 18 is arranged to act only with certain intensity of current. The heating of the fuse fires the explosive; the piston 21, pushed downwardly by the pressure so produced, causes the lever 23 to pivot about 24 and drive the sampling tube 25 into the stratum to be sampled as shown in Fig. 3. When the cooling of the gases resulting from the explosion and leakage around the piston 21 have caused a reduction of pressure in the cylinder 17 the moving members return to the position of Fig. 2 under the effect of a strong leaf spring 26. During this movement the fragments of the bed A which have become wedged into the sampling tube by the driving of the latter into the earth remain held there and are found there when the apparatus is returned to the surface.

It is, of course, easy to arrange on the same structure any number of similar sets of apparatus by means of which samples of a series of strata may be taken without raising the apparatus each time to the surface. The described means, including cylinder 17 and its adjuncts, whereby the core-taking device is actuated, is, for convenience, hereinafter termed a gun. It will be observed that, by means of the operating connections between the gun and the core-taking device 25, the latter is maintained at all times in mechanical connection with the body 1.

When taking samples of oil bearing strata it is frequently of advantage to obtain and enclose in a fluid-tight container a certain volume of the oil impregnating the sand. This container should be completely closed. In fact the oil contains gases in solution under a very high pressure which tend to escape from the core of oil bearing sand when it is raised to the surface and is no longer subjected to the high pressure of the mud always filling the bore hole in such cases. There is thus a risk of the oil disappearing more or less completely from the core and also of changing its chemical composition owing to the distillation of the more volatile hydrocarbons, which pass off first as the pressure is lowered during the raising in the bore hole.

Figure 4:
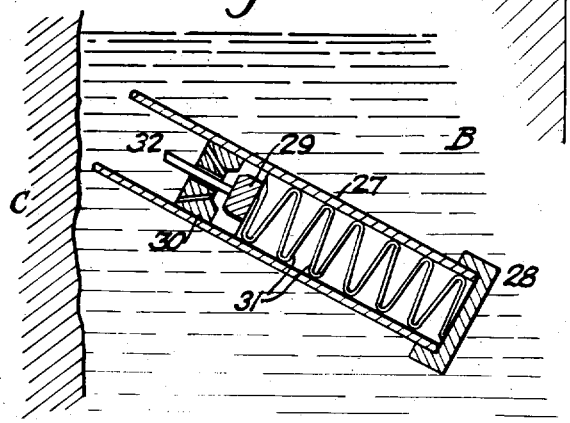
Figure 4 is a section on a larger scale of the coring member itself showing a construction for taking samples of a fluid, oil for example.

Faithful sampling may be carried out without such disturbances by providing the core tube with an arrangement having a closed container to receive a little of the oil. Figure 4 shows diagrammatically on a larger scale such a modified tube about to strike the wall of the bore hole for taking a sample of oil bearing sand therefrom. This tube is attached to the lever 23 as indicated at 25 (Figs. 2 and 3).

In Figure 4, B is the mud filling the hole, which is generally on account of the depth and its density at a pressure of 50 to 250 atmospheres; C is the oil bearing sand forming the wall of the hole, 27 is the sampling tube which is closed at its rear end 28 by a screwed metallic cap and has a cutting edge at the other end; 29 is a small valve held to its seat 30 by a spiral spring 31. This spring is strong enough to resist the pressure of the mud and prevent it from entering the rear part of the sampling tube, which thus remains full of air at atmospheric pressure. When the sampling tube 27 enters the oil bearing sand C the latter fills the front part 32, presses the stem of the valve 29 and raises it. On account of the surrounding pressure the oil is forced into the empty rear part of the sampling tube. The closure of the valve 29 when the sampling tube is withdrawn ensures the retention of this sample of fluid, which after the raising of the sampling tube to the surface can be withdrawn by unscrewing the plug at 28. It is, of course, easy at the surface to take any precautions which may be necessary to retain the more volatile constituents.

What is claimed is:—

1. An apparatus for taking cores from the lateral wall of a bore hole comprising a supporting framework, means for lowering said framework into the bore hole, a coring member on said framework, a receptacle thereon for an explosive charge to urge the tool forward on its explosion, means for retracting said tool out of the lateral wall of the bore hole, electrical means for firing said explosive charge and an electric cable connecting the detonating means to a source of electricity at the surface.

2. An apparatus for taking cores from the lateral wall of a bore hole comprising a supporting framework, means for lowering said framework into the bore hole, a coring member on said framework comprising a closed container for receiving and retaining a sample of oil impregnating an oil bearing sand, electrically controlled means arranged on the supporting framework for producing the movement of the coring member, a cable connecting said means to a source of electricity at the surface, the arrangement being such that the coring operation can be electrically controlled from the surface.

3. An apparatus for taking cores from the lateral wall of a bore hole comprising a supporting framework, means for lowering said framework into the bore hole, a coring member on said framework comprising a closed container for receiving and retaining a sample of oil impregnating an oil bearing sand and a mouthpiece with valve setting this closed container into communication with the sand, electrically controlled means arranged on the supporting framework for effecting the displacement of the coring member and an electric cable connecting said means to a source of electricity at the surface, the arrangement being such that the movements of the coring member can be electrically controlled from the surface.

4. An apparatus for taking cores from the lateral wall of a bore hole comprising a supporting framework, means for lowering said framework into the bore hole, a coring member on said framework, electrically controlled means for imparting movement to said member, electrodes arranged on the supporting framework, an electric cable connecting said means and said electrodes to a source of electricity at the surface, the arrangement being such as to make it possible by means of electrical measurements taken at the surface to ascertain the nature of the formations traversed by the bore hole at different depths and consequently to adjust the position of the coring apparatus exactly in reference to the various beds.

5. Apparatus for taking cores from the lateral wall of the uncased part of a bore hole, comprising a supporting framework, means for lowering said framework into the bore hole, a movable coring member on said framework comprising a tight container capable of opening by contact with the lateral wall for receiving and retaining a reliable sample of the said lateral wall and the fluid eventually contained therein, means for forcing the coring member into the lateral wall and means operable from the surface for actuating the coring member.

6. Apparatus for taking cores from the lateral wall of the uncased part of a bore hole, comprising a supporting framework, means for lowering said framework into the bore hole, a tight chamber upon said framework for receiving an explosive charge, a piston forming one of the walls of said chamber, a coring member comprising a tight container having a valved inlet for receiving and retaining a reliable sample of the fluid impregnating the lateral wall of the bore hole, mechanical connections between said piston and said coring member through which the latter is actuated by the movement of the former, means for maintaining said valve closed after the filling of the container with the sample, an electric source of current at the surface, and electrical connections between said source of current and said explosive charge for exploding the latter and forcing the coring member into the wall.

7. Coring tool for taking samples in the lateral wall of the uncased part of a bore hole comprising a tight container having a mouthpiece and having also a removable member for permitting the withdrawal of the samples enclosed therein, a valve for said mouthpiece, and means for maintaining the valve closed until the mouthpiece has been forced into the lateral wall to be sampled.

8. A coring tool for use in taking samples in the lateral wall of the uncased part of a bore hole consisting in a tight container, a mouthpiece on said container, a removable member on said container for permitting the extraction of the samples enclosed therein; a valve on the container, and resilient means for maintaining the valve closed until the mouthpiece has been forced into the lateral wall to be sampled.

9. A core-taking apparatus comprising in combination a gun, a hollow core-taking tool, and connecting means between the tool and the gun through which the tool is operated by the gun and is maintained in connection therewith after discharge of the gun.

10. An apparatus for taking a core from a formation under a great depth of liquid comprising in combination: a gun; means for lowering the gun to and raising it from the level of the formation to be sampled; a hollow core-taking tool; explosive means and connections for driving the tool from the gun into the formation to take a sample therefrom; means for protecting the explosive means from the liquid; and connecting means between the tool and the gun, operative after the latter has been fired for retrieving from the formation that portion of the tool which contains the sample.

11. A core-taking mechanism comprising in combination a gun, a hollow core-taking tool, and retrieving means attached to the tool connected with said gun so as to be operated by the discharge thereof.

12. A core-taking mechanism, comprising in combination, a hollow core-taking projectile, means for explosively forcing said projectile into a formation, and retrieving means secured to the projectile.

13. In an apparatus for obtaining a sample of a formation at or near the bottom of a bore-hole, the combination of a tool-firing device, means for lowering the same into the hole, a projectile-tool having at its front end a sample-taking mouth, operating connections between said tool and said firing device, and means connected to said tool for retrieving the same after said device has been fired.

14. A core-taking apparatus comprising in combination, a body; means for lowering and raising said body; means for generating an explosive force in said body; a core-taking tool carried by said body and operated by the discharge of said gun; means for transmitting said explosive force to said tool; and connecting means between said body and said tool whereby said tool may be retrieved with said body.

15. The method of taking a sample of sub-soil, which method comprises explosively forcing a core-taking tool into the soil, maintaining at all times a connection with said tool, and retrieving said tool with its contained sample by means of said connection.

16. The method of taking a sample of sub-soil, which method comprises the steps of explosively forcing a core-taking tool into the soil, maintaining a retrieving connection with said tool at all times, and retrieving said tool by means of said connection.

ANNE MARGUERITE LOUISE DOLL,
*BORN* SCHLUMBERGER,
*Administratrix of the Estate of Conrad Schlumberger, Deceased.*